US012738126B2

(12) United States Patent
O'Hara et al.

(10) Patent No.: US 12,738,126 B2
(45) Date of Patent: Sep. 15, 2026

(54) AUTOMATIC ON-BOARD CONTROLLERS FOR ELECTRONIC GAMING DEVICES

(71) Applicant: Aristocrat Technologies, Inc., Las Vegas, NV (US)

(72) Inventors: Jeremiah O'Hara, Las Vegas, NV (US); Anthony Patton, Las Vegas, NV (US); Samarth Raman, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 207 days.

(21) Appl. No.: 18/625,558

(22) Filed: Apr. 3, 2024

(65) Prior Publication Data

US 2025/0087054 A1 Mar. 13, 2025

Related U.S. Application Data

(60) Provisional application No. 63/582,449, filed on Sep. 13, 2023.

(51) Int. Cl.
*G07F 17/00* (2006.01)
*G07F 17/32* (2006.01)

(52) U.S. Cl.
CPC ...... *G07F 17/3258* (2013.01); *G07F 17/3225* (2013.01)

(58) Field of Classification Search
None
See application file for complete search history.

(56) References Cited

U.S. PATENT DOCUMENTS

| | | | | |
|---|---|---|---|---|
| 7,934,993 | B2 * | 5/2011 | Kuehling | G07F 17/3269 463/40 |
| 10,366,567 | B2 | 7/2019 | Bruzzese | |
| 10,431,043 | B2 * | 10/2019 | Lawson | G07F 17/3258 |
| 10,639,529 | B1 * | 5/2020 | Luciano, Jr. | A63B 60/46 |
| 11,159,945 | B2 * | 10/2021 | Obaidi | G06F 16/1824 |
| 11,482,075 | B2 * | 10/2022 | Narra | G07F 17/3227 |
| 11,621,959 | B2 * | 4/2023 | Salkintzis | H04L 63/0869 705/44 |
| 12,456,349 | B2 * | 10/2025 | Shaffer, Jr. | G07F 17/3225 |

(Continued)

*Primary Examiner* — Paul A D'Agostino
(74) *Attorney, Agent, or Firm* — Blank Rome LLP

(57) ABSTRACT

The present disclosure concerns automatic distributed on-board controllers (OBCs) for electronic gaming machines (EGMs). In particular, various schemes to host a distributed OBC across multiple peer machines are disclosed herein. Traditionally, a "progressive" controller for a set of EGMs comprises a set of services that runs on dedicated servers/hardware and provides progressive functionality (e.g., tracking and administering various "progressive jackpots") for a large number of EGMs. One aim of the OBC schemes disclosed herein is to eliminate the need for dedicated servers or additional hardware for smaller scale progressive setups, such as a relatively small area or a moderately-sized bank of connected EGMs (e.g., less than 32 games) on a casino floor. The embodiments disclosed herein may advantageously help to reduce the cost of running progressives or other forms of group-related or synchronized media information for smaller banks of games, as well as provide additional fault tolerance and data redundancy.

19 Claims, 9 Drawing Sheets

(56) References Cited

U.S. PATENT DOCUMENTS

2004/0199370 A1* 10/2004 Arama .................... H04L 43/50 703/20
2005/0176499 A1* 8/2005 Stronach ................. G07F 17/32 463/27
2005/0192099 A1* 9/2005 Nguyen .................. G06F 21/10 463/42
2008/0090653 A1* 4/2008 Kuehling ................ G07F 17/32 463/29
2009/0093300 A1* 4/2009 Lutnick ............... G07F 17/3293 463/31
2010/0087256 A1* 4/2010 Frattinger ........... G07F 17/3269 463/43
2011/0275432 A1* 11/2011 Lutnick ............... G07F 17/3244 463/25
2013/0005449 A1 1/2013 Ly
2013/0090160 A1 4/2013 Iyer
2013/0157757 A1* 6/2013 Riggs .................. G07F 17/3258 463/27
2014/0045587 A1 2/2014 Johnson
2014/0228107 A1 8/2014 Larsen
2014/0337491 A1* 11/2014 Barreto ................. G06F 16/182 709/221
2016/0065627 A1* 3/2016 Pearl ..................... H04L 65/403 709/204
2017/0351868 A1* 12/2017 Jacob .................. G06F 9/45541
2019/0097900 A1* 3/2019 Rodriguez ............ G06F 9/5011
2019/0182257 A1* 6/2019 Lee .................. G06Q 10/06315
2019/0197832 A1* 6/2019 Lawson .............. G07F 17/3225
2019/0288993 A1* 9/2019 Lin ..................... G06F 11/1425
2020/0058055 A1* 2/2020 Simha ................ G06Q 20/3825
2020/0380826 A1* 12/2020 Taylor .................... H04L 9/3297
2021/0021580 A1* 1/2021 McCallum .......... H04L 63/0209
2021/0090399 A1* 3/2021 Narra .................. G07F 17/3227
2021/0144517 A1* 5/2021 Guim Bernat ........ G06F 9/5072
2021/0165890 A1* 6/2021 Schvey ............... G06F 21/6218
2022/0417473 A1* 12/2022 Davidson ................. H04N 7/56
2024/0331499 A1* 10/2024 Taylor ................. G07F 17/3258
2025/0087054 A1* 3/2025 O'Hara ............... G07F 17/3258

* cited by examiner

AUTOMATIC ON-BOARD CONTROLLERS FOR ELECTRONIC GAMING DEVICES

TECHNICAL FIELD

The present disclosure concerns automatic on-board controllers (OBCs) for electronic gaming devices. In particular, various schemes to host a distributed on-board controller, e.g., for progressive jackpots or other types of synchronized media or information, across multiple peer devices are disclosed herein.

BACKGROUND

Electronic gaming devices, such as electronic gaming machines (EGMs), computers, or other mobile devices, can provide a variety of wagering games, such as slot games, video poker games, video blackjack games, roulette games, video bingo games, keno games and other types of games that are frequently offered at casinos and other locations. Play on electronic gaming devices typically involves a player establishing a credit balance by inputting money, or another form of monetary credit and placing a monetary wager (from the credit balance) on one or more outcomes of an instance (or single play) of a primary or base game.

In some games, a progressive jackpot (or other form of "progressive" prize) may be established that grows over time, e.g., based on player wager activity within the game. In addition to wager-based incrementing of progressive jackpots, other types of "free-to-play" progressive jackpots may also be included in EGM-based gaming environments.

Traditionally, the progressive "controller" for a set of EGMs (also referred to herein as a "bank" of EGMs) comprises a set of services that runs on dedicated servers/hardware and provides progressive functionality (e.g., tracking and administering various progressive jackpots and their current values) for a large number of EGMs.

Thus, it would be desirable to have a scheme for administering progressive prizes (or other types of synchronized media or information) that eliminates the need for dedicated servers or additional hardware—especially for smaller scale setups, such as a relatively small area or a moderately-sized bank of connected EGMs (e.g., less than 32 games) on a casino floor. Such schemes may advantageously be able to help to reduce the cost of running progressive prizes (or other types of synchronized media or information) for smaller banks of games, as well as provide additional fault tolerance and data redundancy for the progressive prizes.

DETAILED DESCRIPTION

I. Introduction

I.A. Overview

Figure 1:
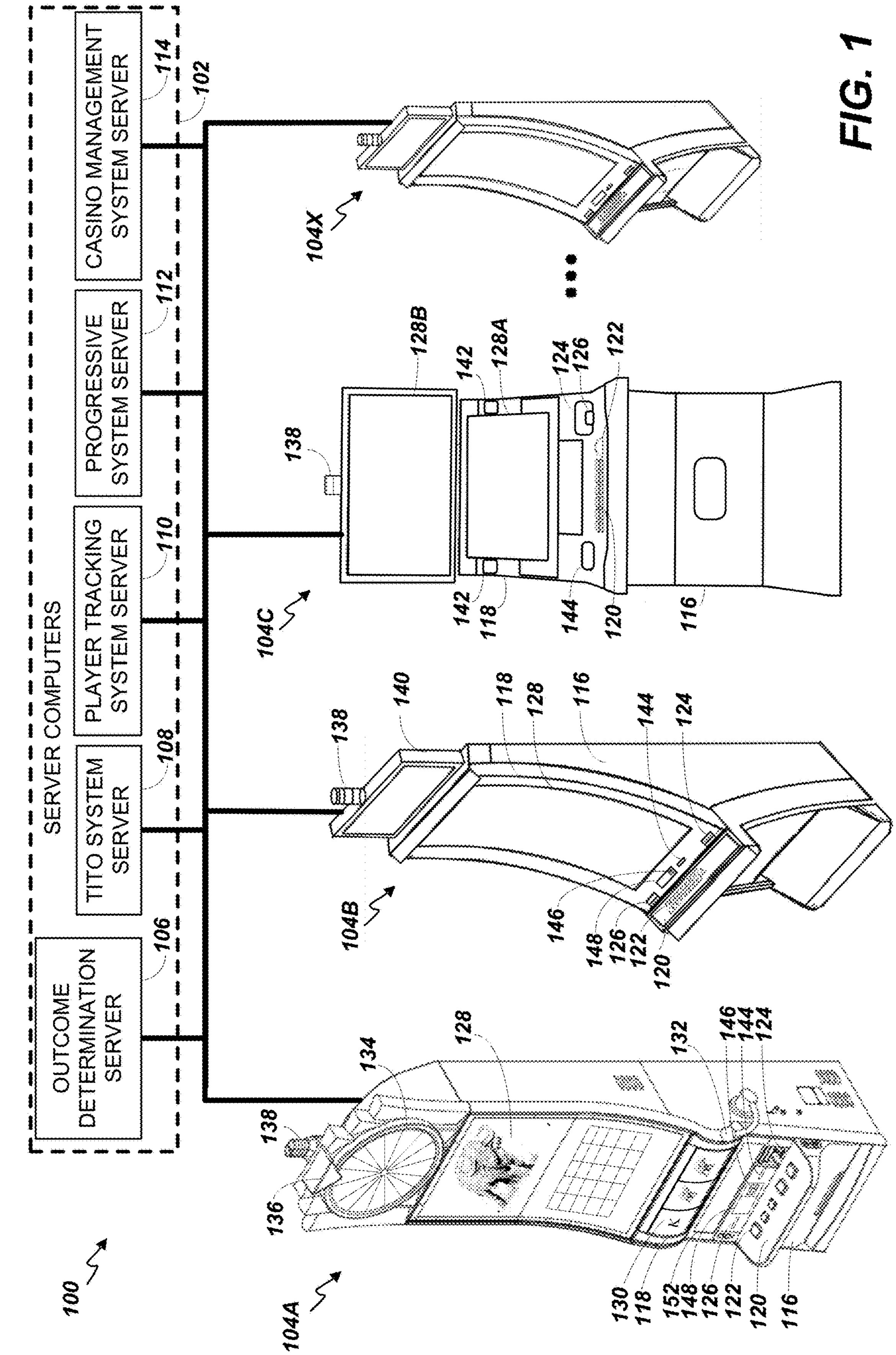
FIG. 1 is an exemplary diagram showing several EGMs networked with various gaming-related servers.

The present disclosure concerns a scheme to implement automatic "on-board" controllers (OBCs) for electronic gaming machines (EGMs). For example, various schemes to host a distributed OBC for administering progressive jackpots (or other types of synchronized media or information) across multiple peer machines, e.g., machines that discover each other on a network, are disclosed herein.

As introduced above, a "progressive jackpot" or, more simply, a "progressive," as used herein, refers to a jackpot or other form of prize that may be awarded in a gaming environment and whose value (e.g., monetary and/or non-monetary value) grows or "progresses" over time, based on one or more of the following: player activity, amount of money wagered, and/or other randomly-determined events that may occur during a player's gameplay.

Progressive jackpot controllers may be capable of managing numerous jackpot games at one time, wherein each progressive jackpot that is being managed may be assigned a unique progressive jackpot ID. Each progressive jackpot may also be associated with its own set of properties, such as incremental rate, jackpot reset values, and auto-approve limits (i.e., an amount under which funds may be distributed immediately to the player). With these identifiers and properties, the progressive jackpot controller can simultaneously track, monitor, and award multiple jackpot prizes to different gaming devices and players, e.g., across different gaming ecosystems and/or different designated games, so long as they have registered their progressives with the progressive jackpot controller(s).

Further, each jackpot game may have one or more "variations" that are played in the wild, wherein a variation, as used herein, refers to a game configuration with a common set of pay table-related variables, e.g., Return to Player (RTP) requirements, incremental rate, jackpot reset values, etc. Some game variations may have similar enough configurations that they may be able to share progressive jackpots across game variations, whereas other game variations have enough difference in their configurations that progressive jackpots are not able to be shared across the different variations of the game that may be being played in the wild.

According to some implementations, when EGMs on a connected bank are enabled to use the improved distributed OBCs disclosed herein, the EGMs in the connected bank will automatically discover each other and form a "cluster" or "progressive cluster," also referred to herein as a peer group of EGM devices.

According to some implementations, once the peer group discovery process is complete, the EGMs will "elect" one of the EGMs in the cluster to be the "leader" device and serve as the actual (i.e., currently active) progressive controller for the peer group. A subset of other EGMs in the peer group will be designated as "leader eligible" or "leaderable" to provide robust automatic failover, e.g., in the event the elected leader fails or becomes unavailable for longer than a threshold amount of time (e.g., 15 seconds). Leader eligible EGMs will stay in sync with the leader EGM at all times to ensure that failover is immediate and no information related to the currently active progressives is lost. Allowing several EGMs to participate in a leader-eligible model provides an even more robust model than a typical primary/secondary failover scenario. EGMs in the peer group that are neither the leader nor leader eligible will be referred to herein as simply "participating EGMs."

Once the leader election process is complete, all participating EGMs may automatically provide configuration information (e.g., progressive jackpot configuration information) to the leader EGM, allowing its OBC to automatically create progressive links and/or levels if they do not yet exist. If an eligible progressive has already been created, the OBC will automatically add the providing EGM to it and begin accepting subsequent contribution information and jackpot notifications. As may now be appreciated, these features allow for a bank-level progressive group that is easy for technicians to set up and requires minimal human intervention. It is also to be understood that the innovations presented herein can be extended to more than just progressives prizes. For example, analogous distributed hosting/computing concepts for EGM clusters may be applied to other EGM-related features, such as community gaming features (e.g., media and/or state information related to games that are on the same network), media synchronization features, etc.

I.B. Exemplary Embodiments and General Considerations

The innovations described herein include an electronic gaming device (EGM), the EGM comprising: one or more processors; memory; and control logic, implemented using the one or more processors and memory, configured to perform operations, comprising: executing an on-board controller (OBC), wherein the OBC is configured to be able to: perform progressive award calculations and store results of the progressive award calculations to the memory.

The control logic of the EGM may also be configured for: executing a peer device discovery process, wherein the peer device discovery process is configured to cause: discovery of a first number, n1, of electronic gaming devices that comprise a peer group; determination of a second number, n2, of electronic gaming devices within the peer group to be part of a leader quorum; and election of one electronic gaming device within the leader quorum as a current leader of the peer group. According to some embodiments, each electronic gaming device within the peer group is determined to be part of the leader quorum when the first number, n1, is three or fewer. According to some embodiments, the second number, n2, is always determined to be an odd number. According to some such embodiments, an OBC of the current leader is configured to: perform requested progressive award calculations; store results of the requested progressive award calculations; and transmit the results of the requested progressive award calculations to the other electronic gaming devices in the peer group.

The control logic of the EGM may also be configured for: executing at least one gaming platform comprising a progressive award, wherein the progressive award is able to be contributed to by each eligible electronic gaming device in the peer group.

Finally, the control logic of the EGM may also be configured for: executing an OBC client, wherein the OBC client is configured to transmit and receive messages (e.g., messages related to contributions to progressive jackpots and/or other types of synchronized media or information) to and from the at least one gaming platform.

According to some embodiments, the OBC of the current leader is further configured to be able to: store configuration information related to all active progressive awards within the peer group.

According to some embodiments, the election of the current leader is performed using a Raft consensus algorithm.

According to some embodiments, in response to the current leader becoming unavailable for a threshold amount of time, a replacement leader from the leader quorum is elected to be the current leader.

According to some embodiments, the replacement leader is configured to synchronize its state machine log with the other electronic gaming devices of the leader quorum upon being elected the current leader.

According to some embodiments, the current leader is further configured to: maintain a state machine log; and transmit the state machine log to the other electronic gaming devices of the leader quorum.

According to some embodiments, the current leader is further configured to: receive configuration information, e.g., progressive-related configuration information, from each of the other electronic gaming devices of the peer group.

According to some such embodiments, the current leader is further configured to: automatically add each electronic gaming device of the peer group to each progressive award that it is eligible for, based on the corresponding received configuration information.

According to other embodiments, the messages comprise one or more of: progressive award contribution amounts; progressive award increment amounts; progressive award distribution messages; or progressive award reset messages.

The innovations disclosed herein can also be implemented as part of a method, e.g., involving a group of electronic gaming devices (such as an EGM) and/or a network switch or other components(s) configured to assist in performance of the claimed methods. The innovations may also be embodied on non-transitory computer-readable media storing computer-executable instructions for causing one or more processors in a computer system to perform the disclosed methods.

The various innovations can be used in combination or separately. This high-level summary is provided to introduce a selection of concepts in a simplified form that are further described below. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples.

Examples may also be capable of other and different applications, and some details may be modified in various respects—all without departing from the spirit and scope of the disclosed innovations. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique/tool does not solve all such problems. It is to be understood that other examples may be utilized and that structural, logical, software, hardware, and electrical changes may be made without departing from the scope of the disclosure. The following description is, therefore, not to be taken in a limited sense. Rather, the scope of the present disclosure is defined by the appended claims.

II. Example Electronic Gaming Servers and Electronic Gaming Machines or Devices FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.), which server computers 102 can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet, through a website maintained by a computer on a remote server, or over an online data network, including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure while connected locally to a machine hosting the aforementioned gaming platform. In some such cases, the local machine(s) hosting the gaming platform may be within the gaming device 104. However, it is typical to find multiple electronic gaming devices connected to networks implemented with one or more of the different server computers 102 described herein.

II.A. Example Server Computers.

The server computers 102 may include an outcome determination server 106, e.g., a central determination gaming system server, a multimedia content distribution server, or other type of backend server (examples of which will be discussed in greater detail below), a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on an outcome determination server 106 and then transmitted over the network to any of a group of remote terminals or remote gaming devices 104A-104X that utilize the game outcomes and display the results to the players. Additional features of an improved progressive system server 112 comprising a flexible progressive jackpot system, which may, e.g., be hosted in a cloud-based environment—rather than being located on-site at a land-based casino, as progressive system server 112 shown in FIG. 1 is—will be described in further detail below, e.g., with reference to FIG. 4 et seq.

II.B. Example Gaming Devices

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
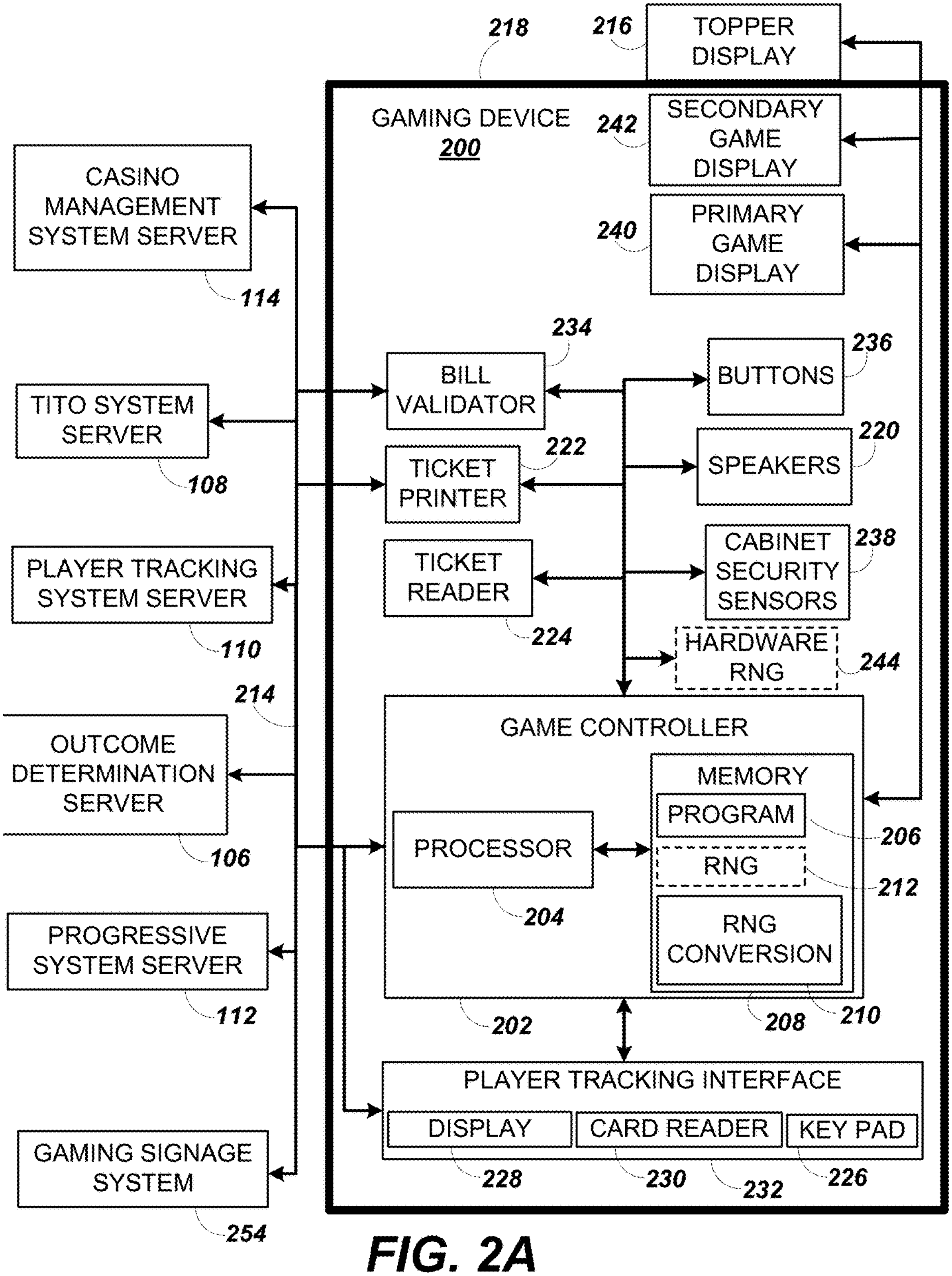
FIG. 2A is a block diagram showing various functional elements of an exemplary EGM.

Many or all the above-described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

II.C. Example Components of Gaming Devices

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as an outcome determination server 106 (also shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200.

In some embodiments, the outcome determination server 106 may comprise a multi-threaded architecture, allowing multiple connections and/or game instances to utilize the outcome determination server 106. In some implementations, e.g., wherein the outcome determination server 106 is hosted at a cloud service provider, the amount of resources at the cloud service provider that are dedicated to a particular game (e.g., number of servers, number of threads, amount of memory, bandwidth, etc.) may be scaled dynamically to accommodate the real-time needs of the hosted game. When a game is stored on gaming device 200, it may be loaded from memory 208 (e.g., from a read only memory (ROM)) or from the outcome determination server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features. It is to be understood that, in certain embodiments, one or more of the functions described above as being performed by game controller 202 (e.g., the RNG functionality, game program storage and/or execution, etc.) may also be performed in whole, or in part, by a hosted server platform, such as outcome determination server 106 or other servers. As will be explained in more detail below, in some embodiments, a client/server architecture may be employed with a game front end application passing requests and other information to a game backend layer, via an application service layer.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate case of description and explanation.

II.D. Example Gaming Environment

Figure 2B:
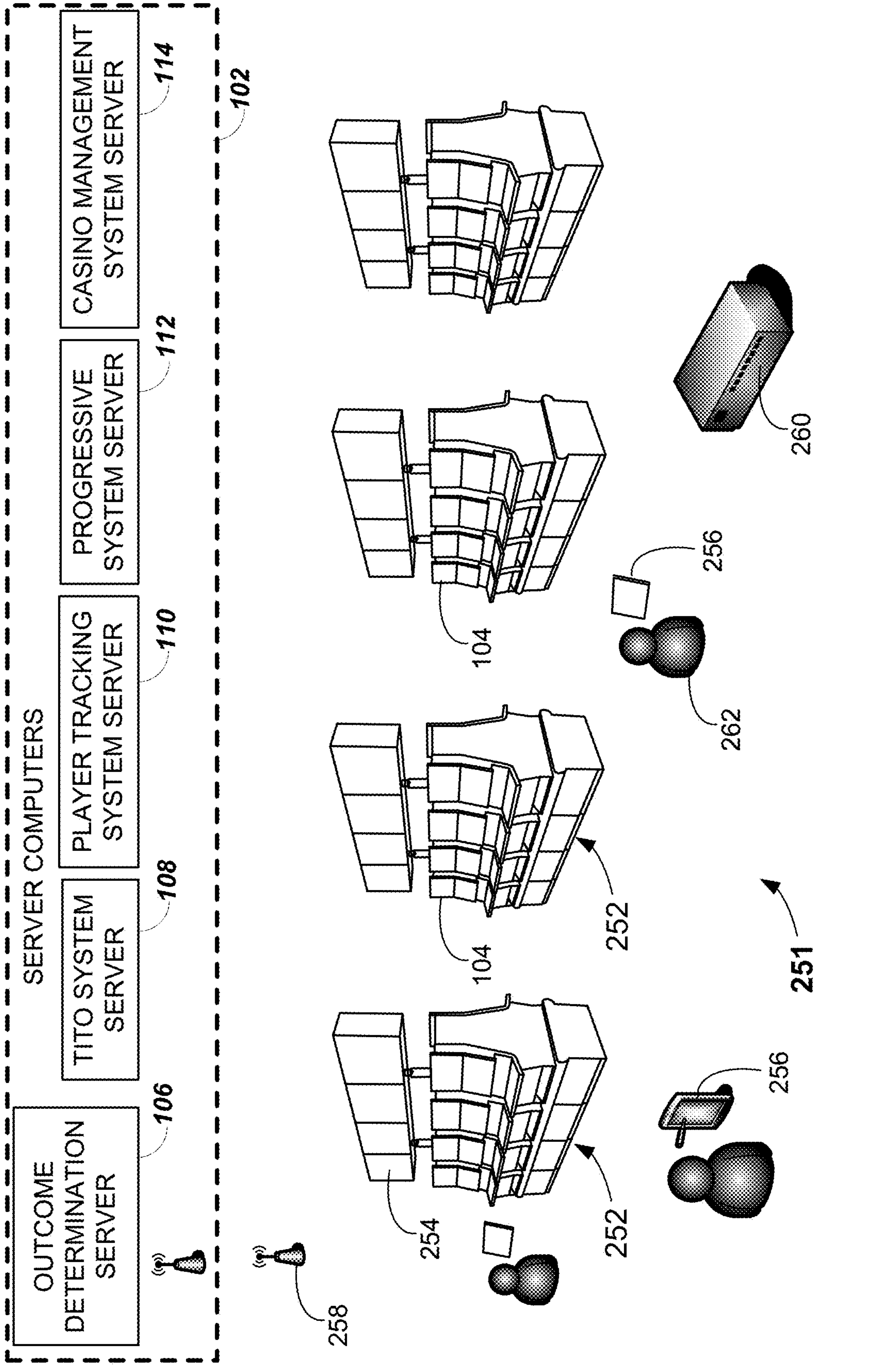
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258. In other examples, the mobile gaming devices 256 may also be configured for communication with one or more other devices external to the casino 251, e.g., players located elsewhere in a particular city, elsewhere in a particular state, at a particular casino's other locations, and so forth. Additional details regarding the use of devices, e.g., Internet of Things (IoT) devices as jackpot controllers and/or jackpot collection devices for banks of EGMs may be found in commonly-assigned U.S. patent application Ser. No. 17/857,988, filed Jul. 5, 2022, and entitled, "Data Collection Cloud System for Electronic Gaming Machines" (hereinafter, "the '988 application"), which is hereby incorporated by reference in its entirety.

According to some examples, the mobile gaming devices 256 may be configured for stand-alone determination of game outcomes. However, in some alternative implementations the mobile gaming devices 256 may be configured to receive game outcomes from another device, such as the outcome determination server 106, progressive system server 112, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

II.E. Example Distributed Gaming Delivery

Figure 2C:
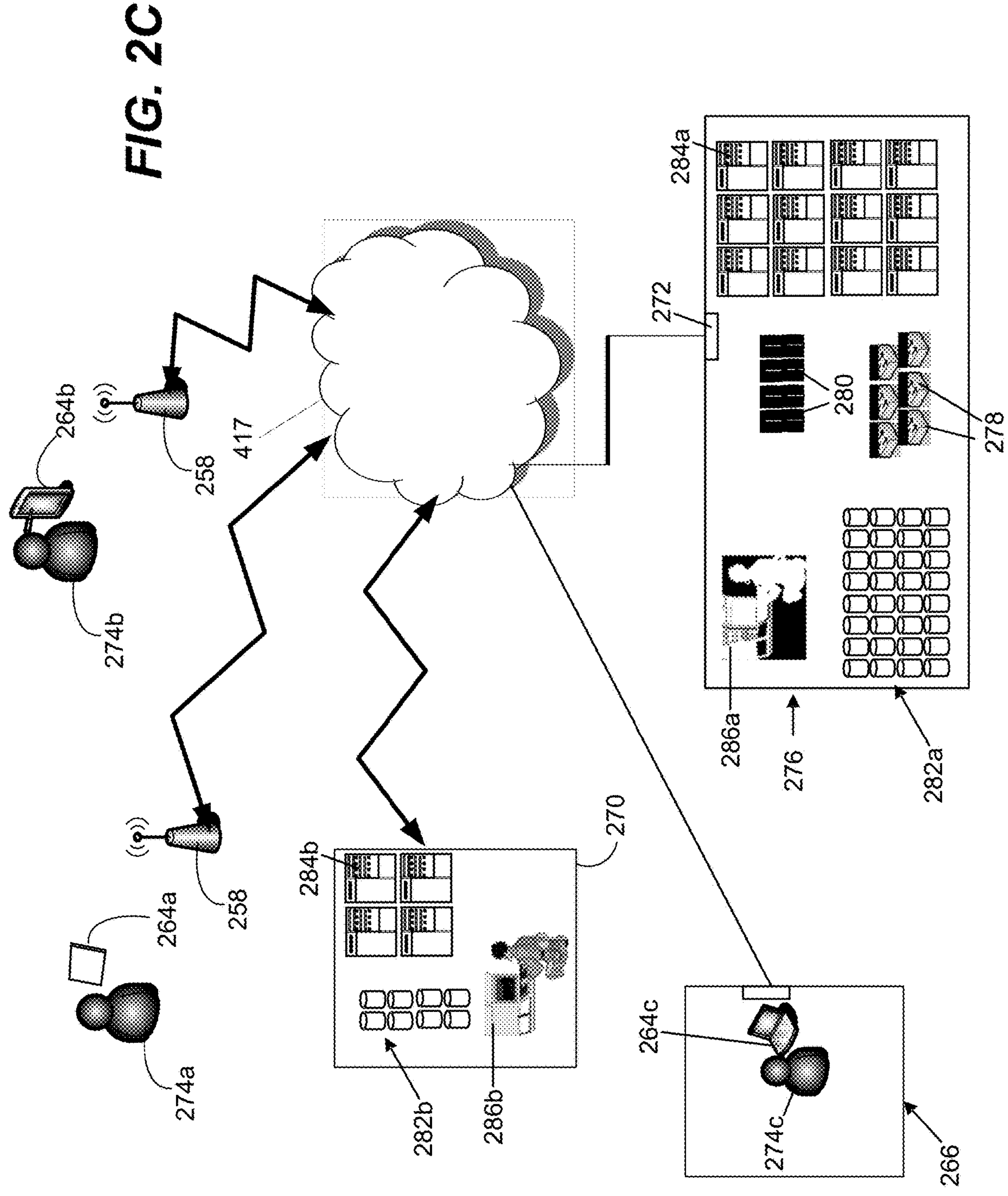
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272, including and one or more workstations 286*a*. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers. In still other examples, as will be explained in further detail below, one or more third party cloud-based service providers may be utilized by a given casino, a given game developer, or given game studio to host backend game functionality for a number of different games (and/or a number of different players) simultaneously, according to a general service architecture and flexible backend platform design implementing a novel GDK to enhance and componentize game development.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

II.F. Example Game Processing Architecture

Figure 3:
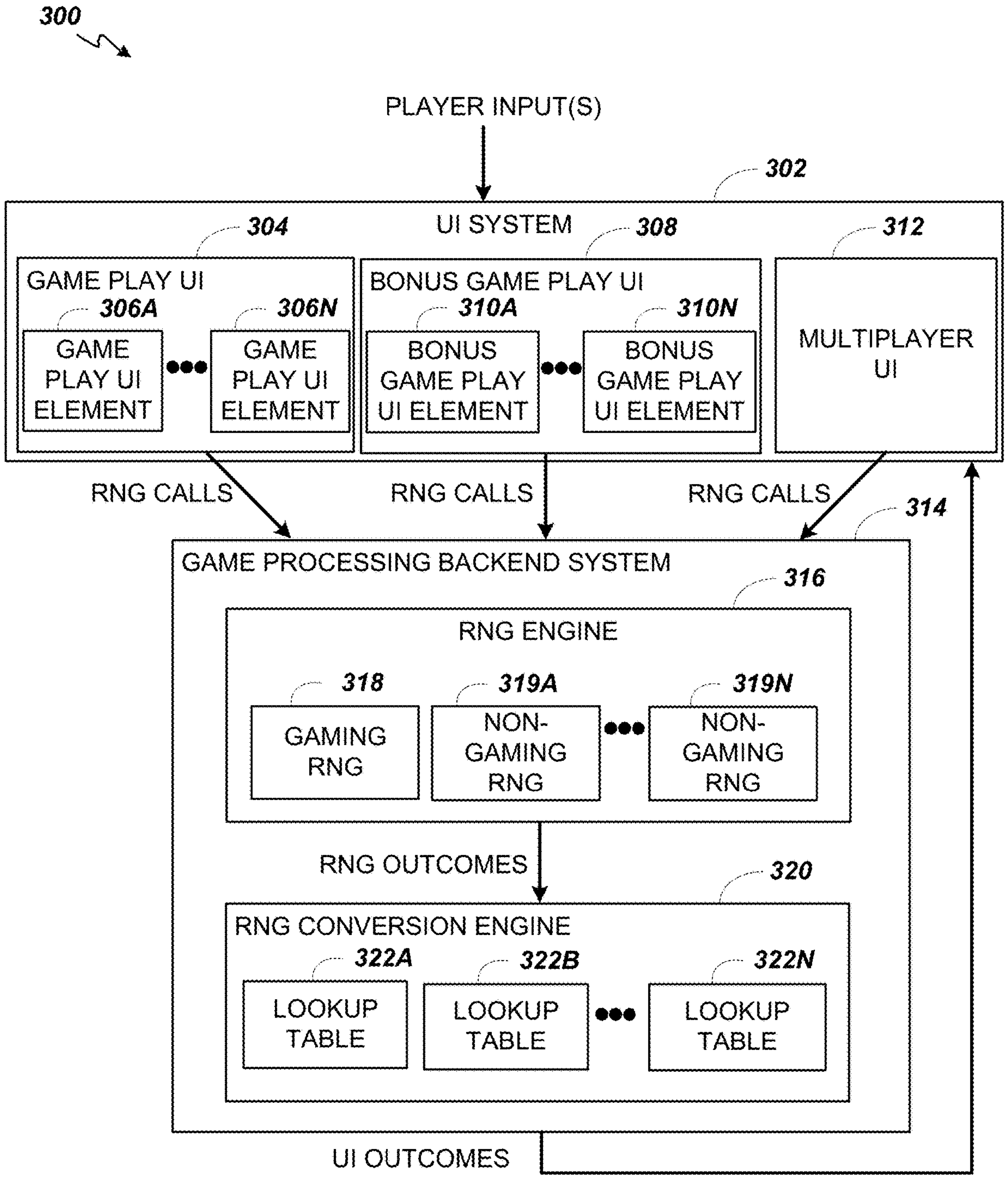
FIG. 3 illustrates, in block diagram form, an implementation of a game processing architecture algorithm that implements a game processing pipeline for the play of a game, in accordance with various implementations described herein.

FIG. 3 illustrates, in block diagram form, an implementation of a traditional, i.e., non-hosted, game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, as will be discussed in further detail below, portions of the gaming processing architecture 300 can implement the game processing pipeline using a gaming device and one or more remote gaming devices, such as outcome determination server 106 shown in FIG. 1. In such implementations, the game processing pipeline may also utilize one or more game service clients, e.g., to pass inputs and requests between the gaming device/gaming application and the backend gaming system server that is hosting aspects of the game's functionality.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. (As mentioned above, in embodiments wherein aspects of the game's functionality are hosted by a backend server, the UI outcomes may be determined by the hosted game backend and then returned to the game via an application service layer so that the game application may update the appropriate audio and/or visual gameplay elements.) Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In yet another example, the UI outcome may reflect updating a visual display element (e.g., a virtual meter) with an updated progressive jackpot value. In response to updating the appropriate UI, the player may subsequently provide additional player inputs to initiate a subsequent game instance that progresses through the game processing pipeline.

III. Example Embodiments

III.A. An On-Board Progressive Controller Distributed Across a Group of Peer Electronic Gaming Devices In the land-based/casino environment, casinos typically install specialized jackpot controller hardware to accurately track, monitor, and award progressive jackpot prizes in a closed-loop network. Such hardware jackpot controllers are typically specially configured to perform functionality that is often required by stringent gaming regulations.

As an example, jackpot progressive values must be accurate and need to be subject to a high degree of auditability. Specifically, each contributor to a progressive must have an accurate progressive money wagered meter that can be reconciled for each jackpot that is triggered (i.e., awarded to a particular player).

One technical problem that may be overcome via the various embodiments and solutions described herein involves implementing an on-board controller (OBC), e.g., for administering progressive jackpots or other shared/synchronized information types, in a casino environment that does not require the dedicated servers/hardware typically needed to provide, e.g., progressive jackpot functionality (e.g., tracking and administering various "progressive jackpots") for large numbers of EGMs.

Thus, one aim of the OBC schemes disclosed herein is to eliminate the need for such dedicated servers or additional hardware for smaller scale progressive setups, such as a relatively small area or a moderately-sized bank of connected EGMs (e.g., less than 32 games) on a casino floor. The embodiments disclosed herein may advantageously help to reduce the cost of running progressives or other shared/synchronized information types for smaller banks of games, as well as provide additional fault tolerance and data redundancy, e.g., in the event that an EGM within the bank of connected EGMs that was serving as the OBC becomes unavailable for greater than a threshold amount of time (e.g., going offline or powering down).

According to some embodiments, an OBC framework may comprise a set of services for implementing an on-board controller among a peer group of devices. In some implementations, the OBC framework may utilize the .NET platform as its base technology, and it may use a consensus algorithm, such as the Raft protocol, for leader election and fault tolerance.

Compared with prior art approaches, because there is no dedicated hardware for the on-board controller services (e.g., progressive jackpot-related services) and the EGM themselves host the services, the redundancy and fault tolerance is "built in" to the framework using distributed technology.

According to some embodiments, each EGM can potentially be configured to be the "leader" device (e.g., serve as the progressive controller). When elected, an EGM device will serve as the progressive controller and will do the progressive processing along with storing the required data. For the distributed OBC systems described herein to work effectively, a group of first number, n1, of EGMs comes online and creates a leader quorum, e.g., consisting of a second number, n2, of EGMs that is less than or equal to n1. In some embodiments, the number n2 may be chosen randomly based on the value of n1. Once the leader quorum is up and running, one of the EGMs will be elected as the leader (i.e., serving as the progressive controller) using the Raft algorithm or other consensus algorithm, as desired.

At that point, the progressive clients (i.e., the other EGMs in the peer group that are not designated as the current leader device) can connect to the leader and start executing the progressive workflows in their respective games. If the leader device goes offline for any known or unknown reason, another machine out of the leader quorum may be automatically selected as the replacement leader by the OBC framework and will start acting as the current leader (i.e., serving as the new progressive controller for the peer group of EGMs). Thus, the progressives for the peer group of EGMs can remain active for as long as there are enough EGMs in the quorum to elect a replacement leader if the device serving as the current leader ever becomes unavailable.

Figure 4:
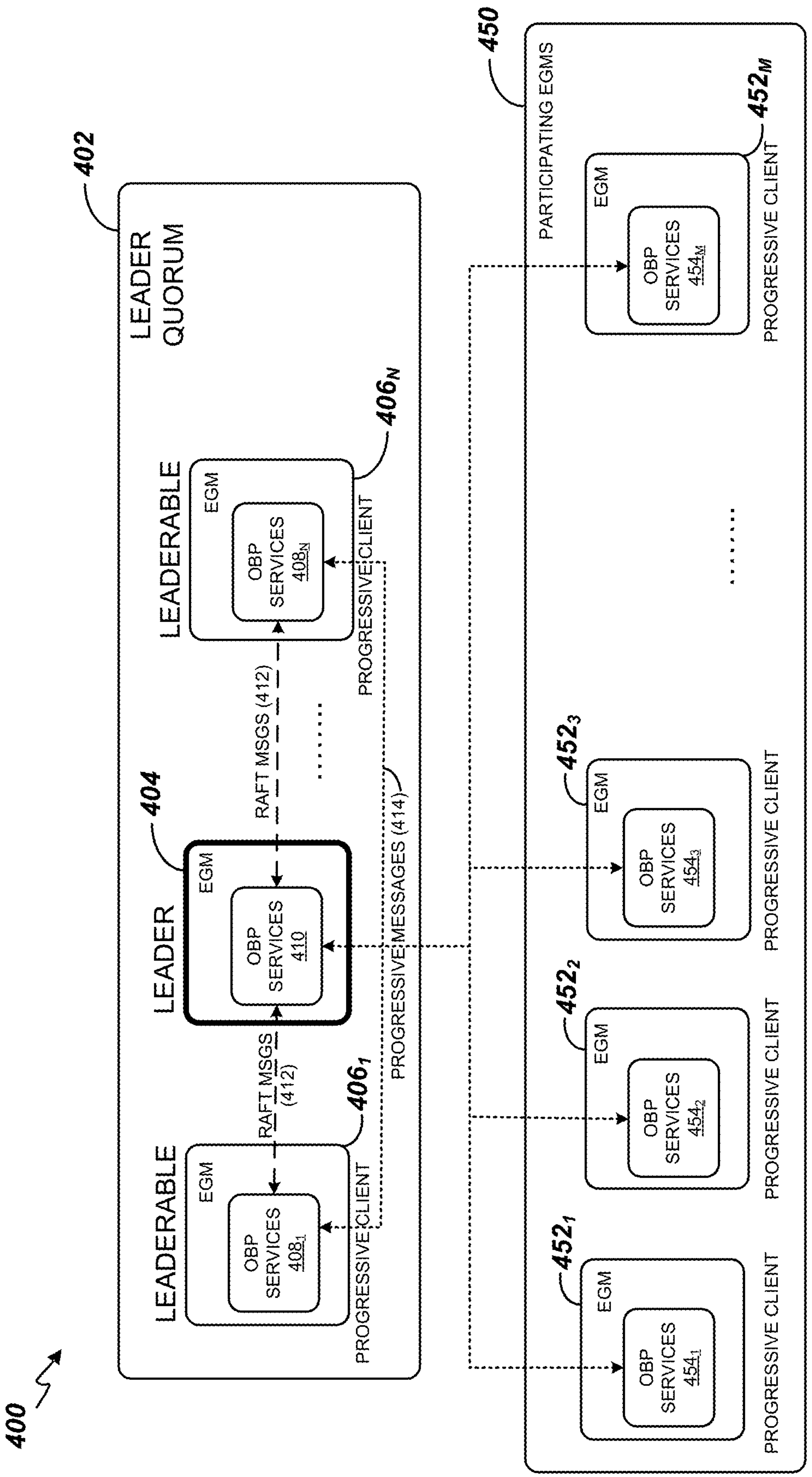
FIG. 4 illustrates, in block diagram form, an exemplary group of peer electronic gaming devices for hosting a distributed on-board progressive controller, in accordance with various implementations described herein.

Turning now to FIG. 4, a block diagram illustrating an exemplary group 400 of peer electronic gaming devices hosting a distributed on-board controller (OBC) for administering progressive jackpots is shown, in accordance with various implementations described herein. (Note: Although the examples of FIGS. 4-6 herein are described predominantly in the context of an on-board controller for administering progressive jackpots, as described above, the techniques presented herein are equally applicable to any number of forms of information that may be synchronized and/or administrated across a peer group of devices by use of an on-board controller, such as media, community/leaderboards, etc.) The leader quorum is shown in box 402, comprising the EGM that is currently the leader 404 and various other EGMs that have been designated as leaderable (i.e., $\mathbf{406}_1 \ldots \mathbf{406}_N$), i.e., part of the leader quorum and available to step into the role of leader for the peer group, e.g., in the event that leader EGM 404 goes offline or otherwise becomes unavailable. The other discovered EGMs that are a part of the peer group 400, but that are not a part of the leader quorum, are referred to simply as participating EGMs (i.e., $\mathbf{452}_1 \ldots \mathbf{452}_N$), as shown in box 450.

Figure 5:
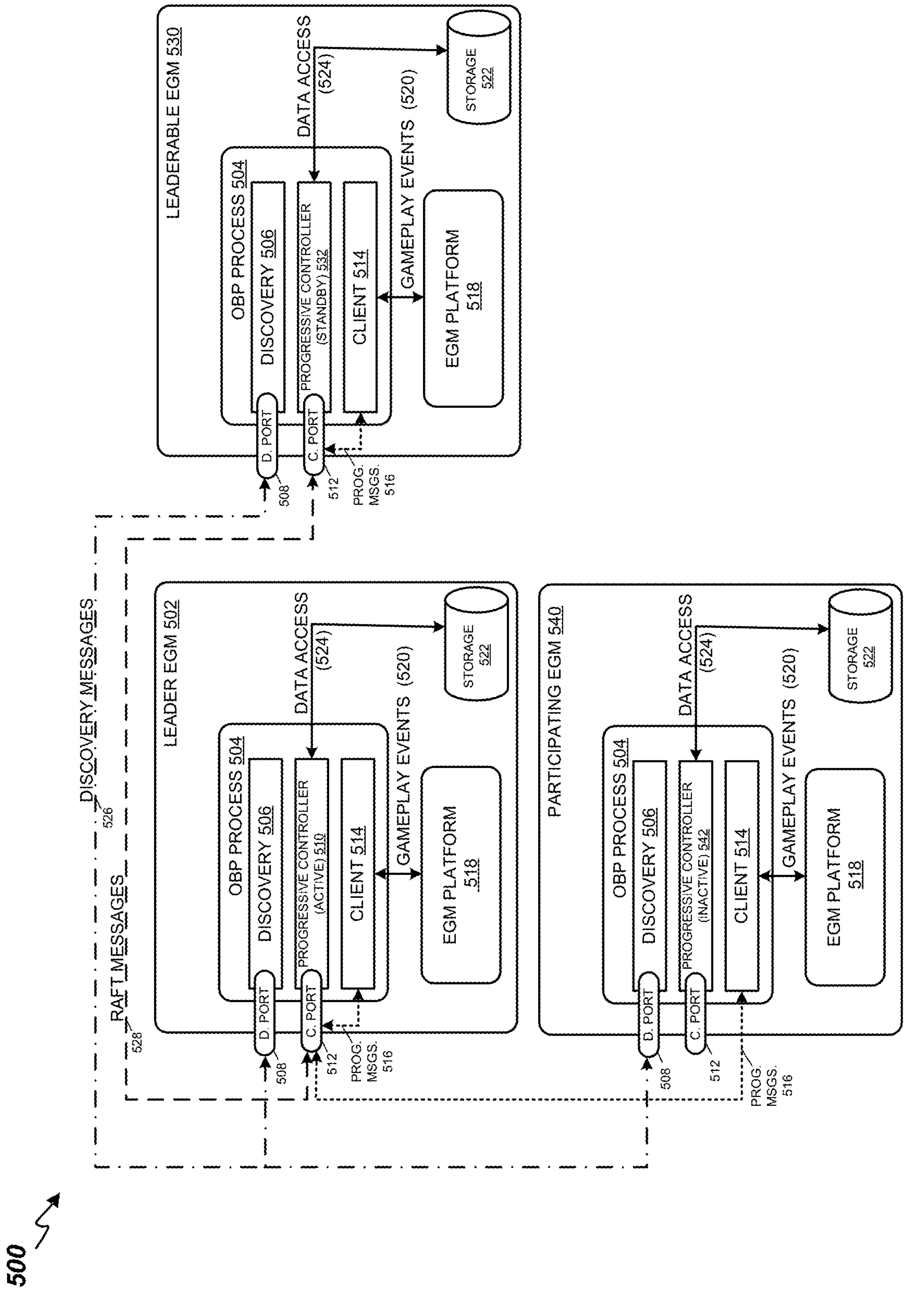
FIG. 5 illustrates, in block diagram form, exemplary components and communications between electronic gaming devices in a group of peer devices hosting a distributed on-board progressive controller, in accordance with various implementations described herein.

Each EGM is executing one or more processes, also referred to in the context of FIG. 4 as on-board progressive or "OBP" services (e.g., 408/410/454), which are providing, or are configured to be capable of providing one or more of the OBP processes, e.g., as will be described in further detail herein and with reference to FIG. 5. In other words, an OBP, as used herein, may be thought of as an OBC that is specially configured to deal specifically with the administration of progressive jackpot prizes. As one example, each so-called progressive client 406/452 (i.e., EGM machine in the peer group, that is not the current leader) will pass one or more messages (referred to in this example as "progressive messages," since the relevant messages for this example will relate predominantly to progressive jackpot contributions), represented by dashed line 414, back and forth with the leader 404, e.g., to accurately track the status of all progressive prizes and contributions thereto, to send configuration information to leader 404, to inform each device when progressive prizes have been won/distributed to a particular EGM in the peer group 400, to send log replication information to EGMs in the leader quorum 402, to send EGM status messages between EGMs, etc. In other words, the leader 404 may serve as a message broker between the various EGMs that are a part of the peer group 400, with the ability to create, update, retrieve, and/or delete data that is shared between the EGMs of the peer group 400.

During the selection of the machines that are to be members of the leader quorum 402 and the election of leader 404, a consensus algorithm, such as Raft, may also pass various messages between EGMs, represented by long-dashed line 412, in order to establish the leadership quorum. As will be described below, once the Raft consensus is established, the peer group will continue to function unless the number of active devices within the leader quorum 402 drops below a minimum threshold number (e.g., two devices). Configuration information for the various progressive jackpots (or other shared/synchronized information types) and devices in the peer group may be stored in a database on each member device of the leader quorum 402. If a device from leader quorum 402 is unavailable for more than a threshold amount of time (e.g., 2 minutes), it may be removed from the leader quorum 402, and a new participating EGM may be selected as a leaderable node, to be made part of leader quorum 402.

Leader 404 may be configured to broadcast a message to all of the other EGMs in the peer group at a first determined cadence (e.g., every 1 second), indicating that it is the leader device and providing the necessary port and connection information to any devices that may be trying to locate a leader and/or receive relevant messages. Similarly, the leader 404 may also be configured to broadcast a message to all of the other EGMs in the peer group at a second determined cadence (e.g., every 10 seconds), e.g., indicating the current values and any other relevant status information for all of the active progressive jackpots (or other types of information) that the leader 404 is currently tracking and administering.

III.B. Exemplary Components and Communications Between Electronic Gaming Devices in a Peer Group Turning now to FIG. 5, a block diagram 500 illustrating exemplary components and communications between electronic gaming devices in a group of peer devices hosting a distributed on-board controller for progressive jackpots is shown, in accordance with various implementations described herein.

First, an exemplary leader EGM 502 is illustrated in greater detail, comprising: an OBP processes module 504, EGM platform 518, and storage 522. According to some embodiments, the OBP processes module 504 may comprise: a discovery module 506; the progressive controller module itself 510 (which is active within the current leader EGM); and a client module 514, the operations of which will be described in further detail below. Discovery module 506 may use a first assigned discovery port 508 for the auto-discovery process, which will be described in further detail below. Similarly, the progressive controller module 510 may use a second assigned controller port 512 for the sending and receiving of progressive messages 516 with the other devices that are part of the peer group, as will also described in further detail below. In other implementations, a first port may be designated as a "publisher" port for all client message communications, and a second port may be designated as a "server" port, wherein all client devices can send their requests to the current leader.

During active operation, the OBP process 504 may be configured to: pass gameplay event-related information 520 back and forth between client 514 and the EGM platform 518 (e.g., information related to progressive contributions made within certain games, progressive prizes being awarded within certain games, community-related information, tournament-related information, synchronized media data, etc.); and perform data access operations 524 on the storage 522 (e.g., reading and writing to log files, transaction data, current progressive values, progressive-related configuration information or other non-progressive-related configuration information, etc.).

It is noted that progressive controller modules analogous to that of 510 in leader EGM 502 may also be present in the OBP processes module 504 of each of the other EGMs in the peer group, e.g., a leaderable EGM 530 (i.e., an EGM that is part of the leader quorum) may have a progressive controller module 532 that is in an "standby" state (i.e., to be activated in the event that EGM 530 becomes the current leader of the peer group), and a participating EGM 540 (i.e., an EGM that is not part of the leader quorum) may have a progressive controller module 542 that is in an "inactive" state (i.e., not being used to manage or track the active progressives for the peer group).

III.B.1. Auto-Discovery Process

As alluded to above, one distinct feature of the OBC frameworks disclosed herein is the auto discovery of the leader device 502 when a participating EGM 540 starts up. This discovery process may be achieved by having a broadcast of discovery-related data messages 526 (which may, e.g., also be encrypted) that happens at regular interval on an agreed-upon port (e.g., 508), e.g., via the User Datagram Protocol (UDP) communication protocol. This will allow for easier configuration of the distributed progressive controller setup. The discovery module 506 will also be responsible for the broadcast of the leader and leader quorum node details to all participating EGMs 540.

III.B.2. On-board Progressive Controller

The active progressive controller module component 510 will be responsible for doing all the progressive calculation activities and recording them to the storage 522. There will be a port (e.g., 512) exposed to receive various progressive messages from the clients. At a given point in time, there will only be one active progressive controller (e.g., 510), which will be running on the elected leader (e.g., 502) based on the Raft implementation. The progressive controller component on the EGMs that are configured to be in the quorum (i.e., leaderable devices) (e.g., 532) will receive the copy of all the progressive messages, and they will be in "standby" mode using the Raft protocol. The progressive controller component on the EGMs that are just participating (e.g., 542) in the progressives and not configured to be in the quorum will be inactive. There may also be a set of one or more APIs, which may be used to configure and query progressives and will be a part of the progressive controller component (510/532/542).

III.B.3. Storage

The storage component 522 will store the data required for progressive controllers to function as a disk. In some implementations, it may use SQLite technology as the database engine for storing and retrieving data, but any storage facility or database as desired (e.g., XML, JSON, etc.) may be used in a given implementation.

III.B.4. EGM Platform

Existing EGM platform(s) 518 for casino gaming devices may need to be updated to be able to send messages to and from the aforementioned progressive client component 514, thereby allowing the client component 514 to send and receive the necessary messages, in this case, progressive-related messages 516 for carrying out progressive prize-related workflows.

III.C. Exemplary Reporting Setup for a Group of Peer Electronic Gaming Devices Hosting a Distributed On-board Progressive Controller According to some embodiments, the OBP controller component may maintain a document of information in its storage component, which will have the details of all the active progressives. Since the querying and formatting of this data can be resource intensive, according to some embodiments, there may be a separate OBP service (e.g., 604), which can query this data from the progressive controller on the leader EGM and then format it for reporting and provide it to a reporting client or the EGM platform, e.g., to display on a user interface (UI) of the device.

Examples of the types of reports that the reporting client of the OBP may be capable of producing include:

(1) Progressive configuration report: This report will contain the configuration information about all the active progressives.

(2) Active progressive report: This report will contain the current and cumulative values of all the active jackpots with information about the participating EGMs.

Other types of reports are also possible, based on the needs of a given implementation, e.g., reports that relate to community leaderboards, tournaments, etc., rather than progressive awards.

As described above, the EGMs that are configured to participate in the on-board progressive setup will be in one or more of three roles: (1) progressive client; (2) leader quorum member (i.e., leaderable); or (3) leader.

(1) Progressive Client: All the participating EGMs will be in this role, which means the OBP client component will always be active. This is so that the client component of the EGM can send and receive the necessary messages.

(2) Leader Quorum Member: Some EGMs can be manually configured to be part of the leader quorum. Doing so will make the progressive controller component active and the EGM will be marked as a potential leader. During execution, this EGM will receive the state data from the leader and maintain it for it to be a potential leader.

(3) Leader: One EGM out of the quorum will be elected for this role by the Raft implementation. Once in this role, the progressive controller component of this EGM will be responsible for carrying out the duties of a typical controller (in this example, a progressive jackpot controller), e.g., maintaining the contributions, processing jackpot hits, etc. The client machines (including itself) will communicate the messages to and from this EGM, and other quorum members will receive the log data from it.

Figure 6:
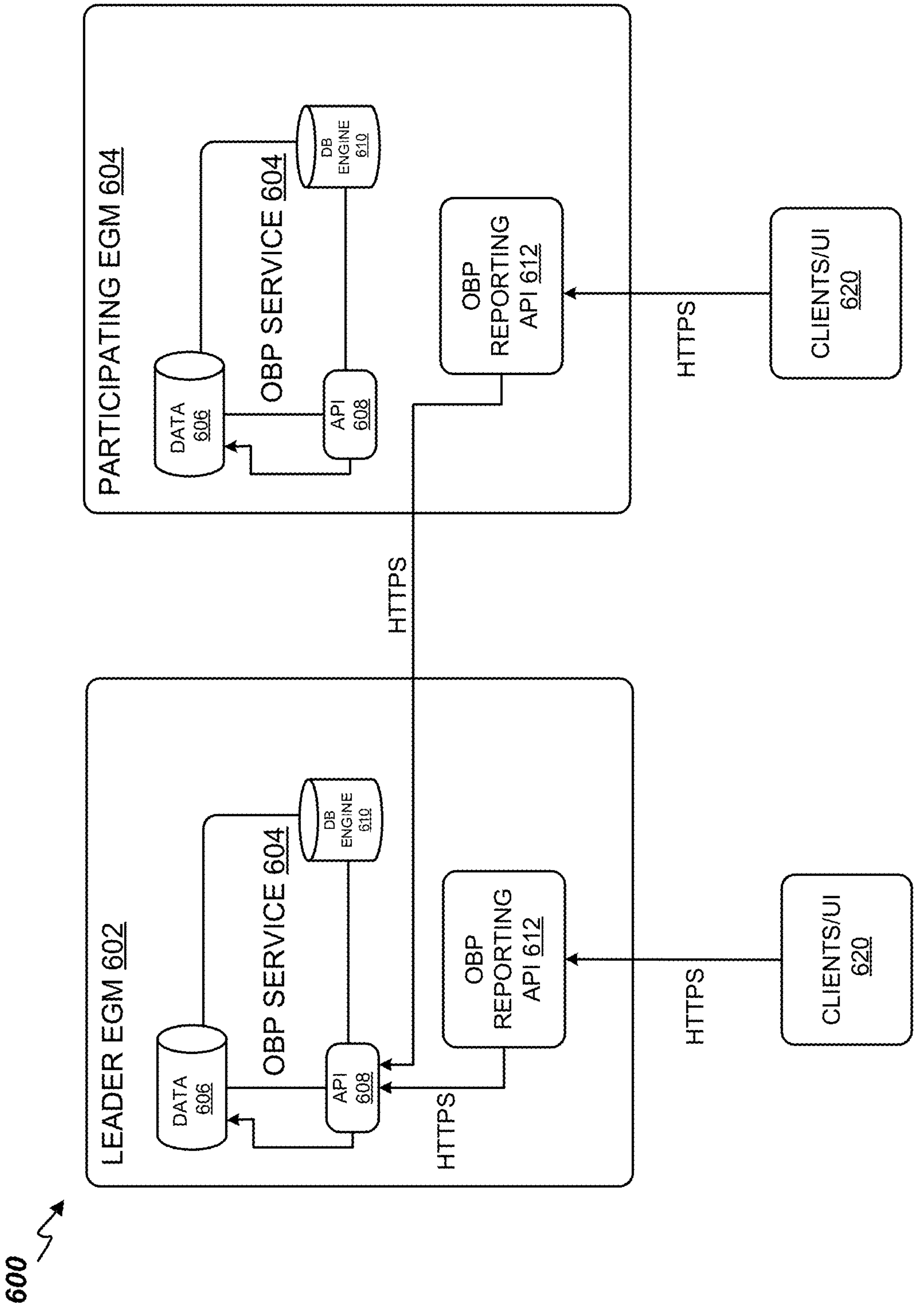
FIG. 6 illustrates, in block diagram form, an exemplary reporting setup for group of peer electronic gaming devices hosting a distributed on-board progressive controller, in accordance with various implementations described herein.

Turning now to FIG. 6, a block diagram 600 illustrating an exemplary reporting setup for group of peer electronic gaming devices hosting a distributed on-board progressive controller is shown, in accordance with various implementations described herein. As described above, a leader EGM 602 may comprise an OBP service 604, which can comprise: a data storage component (e.g., a database) 606, a database engine (e.g., SQLite) 610, and one or more API (608), which may be used to configure and query progressive-related data, as may be requested or reported via an OBP reporting API (612). According to some embodiments, OBP reporting API 612 may be accessed via a client device or user interface 620, e.g., via HTTPS or other secure communication protocol.

According to some embodiments, the reporting API 612 may be implemented as a microservice that will pull the data from the on-board progressive service API 608 and then transform a history object and expose that data as a HTTPS API to the report client/UI 620 in more domain specific objects. The reporting API 612 will preferably be written using a minimal API framework and will be secured using SSL. The reporting API 612 will preferably subscribe to the leader EGM 602's notifications and will always call the leader for its source data. The reporting API 612 will also preferably be installed on all participating EGMs, so the client can connect to any participating EGM in the on-board progressive group to get the desired reports.

III.D. Progressive State Management with Raft

As mentioned above, since the various progressive prize-related solutions described herein are running "on-board" an EGM instead of dedicated hardware, the chance of an OBC on any one EGM being taken down or not being able to communicate for some period of time is higher than in systems with dedicated progressive hardware. For this reason, all the EGMs in the leader quorum will maintain the state of the progressive system. Thus, the log replication features of the Raft implementation may be used in the solutions presented herein. In some implementations, one or more compaction rules may be applied, which cause the log to shrink into a single document or entry. For example, compaction may be forced when certain types of events happen, such as a progressive jackpot prize being awarded, a preset threshold being exceeded, etc.

Raft is a consensus algorithm designed as an alternative to the Paxos family of algorithms. It was meant to be more understandable than Paxos by means of separation of logic, but it is also formally proven safe and offers some additional features. (However, unlike the scenarios presented herein, in a typical Raft implementation, the consensus algorithm is being run on a server with a load balancer, and all devices have known IP addresses.) As is appreciated, Raft offers a generic way to distribute a state machine across a cluster of computing systems, ensuring that each node in the cluster agrees upon the same series of state transitions. In order to write a new transaction to the log, at least a majority of the leader quorum nodes must agree to the transaction. Thus, if a single node goes down, the behavior of the group should be seamless, as long as at least a majority are still online.

The "leader" in a Raft implementation is responsible for the log replication. It also accepts client requests. Each client request consists of a command to be executed by the replicated state machines in the cluster. After being appended to the leader's log as a new entry, each of the requests is forwarded to the followers in the leader quorum, e.g., as AppendEntries messages. In case of unavailability of the followers, the leader may retry AppendEntries messages indefinitely, i.e., until the log entry is eventually stored by all of the followers.

In the case of a leader crash, the logs can be left inconsistent, with some logs from the old leader not being fully replicated through the cluster. The new leader may handle the inconsistency by forcing the followers to duplicate their own log. To do so, for each of its followers, the leader will compare its log with the log from the follower, find the last entry where the logs agree, then delete all the entries coming after this critical entry in the follower log and replace it with its own log entries. This mechanism will restore log consistency in a cluster subject to failures.

In some embodiments, if the number of clients in the leader quorum drops below a threshold number (e.g., if the number of devices in the leader quorum drops below three, in some implementations), one or more of the remaining active devices in the leader quorum (e.g., the leader itself, if still active) may perform an auto discovery process, e.g., by sending out messages to see which of the other participating client devices should be brought into the leader quorum as a replacement device, i.e., in order to meet the threshold number of devices for the leader quorum again. In some implementations, the choice of which participating client device to bring into the leader quorum may be based on how current the data on the respective participating client device is (i.e., favoring participating devices with the most accurate and up-to-date data). In some such embodiments, the leader may also be configured to handle the situation where the IP address of one or more client devices in the cluster changes. For example, the client devices in the leader quorum may be automatically informed of and/or reconfigured with the updated client device IP address(es), so that the operation of the cluster may continue uninterrupted.

Figure 7:
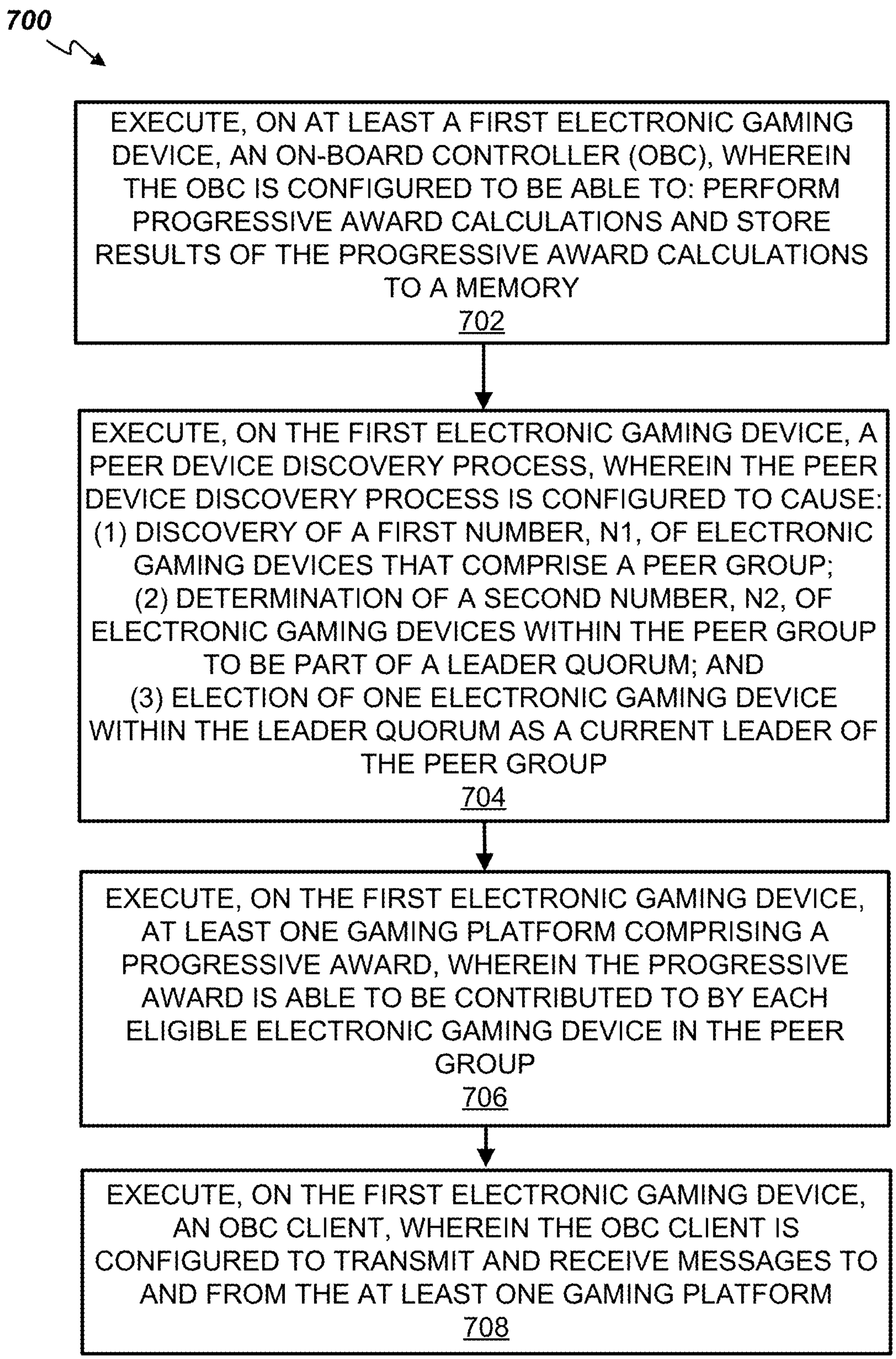
FIG. 7 is a flowchart illustrating an example method for performing an embodiment of the disclosed technology related to hosting a distributed on-board progressive controller for a group of peer electronic gaming devices.

III.E. Exemplary Methods for Establishing and Utilizing a Distributed On-Board Controller for a Group of Peer Electronic Gaming Devices Turning now to FIG. 7, a flowchart, illustrating an example method 700 for performing an embodiment of the disclosed technology related to hosting a distributed on-board controller for a group of peer electronic gaming devices, is shown. In particular, method 700 depicts what happens when an exemplary "first" electronic device initiates a peer group discovery process to identify EGMs on a local network to participate in hosting a distributed on-board controller, e.g., for administering progressive prize awards. (It is to be understood that, in other implementations, all EGMs that are part of a given peer group need not be on the same local network, so long as the device in the leader quorum have the ability to communicate outside of said local network to the other devices that are a part of the peer group.)

First at 702, the method 700 may execute, on at least a first electronic gaming device, an on-board controller (OBC), wherein the OBC, e.g., if it is being utilized to administer progressive prize awards, is configured to be able to: perform progressive award calculations and store results of the progressive award calculations to a memory.

Next, at Step 704, the method 700 may execute, on the first electronic gaming device, a peer device discovery process, wherein the peer device discovery process is configured to cause: (1) discovery of a first number, n1, of electronic gaming devices that comprise a peer group; (2) determination of a second number, n2, of electronic gaming devices within the peer group to be part of a leader quorum; and (3) election of one electronic gaming device within the leader quorum as a current leader of the peer group. As explained in detail above, in some implementations for administering progressive prize awards, the OBC of the current leader may be configured to: perform requested progressive award calculations for the peer group; store results of the requested progressive award calculations; and transmit the results of the requested progressive award calculations to the other electronic gaming devices in the peer group.

In some implementations, the second number, n2, of electronic gaming devices determined to be part of the leader quorum may be determined randomly, and the devices may be selected from among the overall first number, n1, of EGMs initially discovered, e.g., with the value of n2 being based, at least in part, on the value of n1. Thereafter, if one of the leaderable (i.e., leader quorum) nodes goes offline, additional logic may be employed to replace that node with another device from the peer group, e.g., via random selection or other means.

Next, at Step 706, the method 700 may execute, on the first electronic gaming device, at least one gaming platform comprising a progressive award, wherein the progressive award is able to be contributed to by each eligible electronic gaming device in the peer group. As explained in detail above, the gaming platform may comprise one or more games (e.g., casino-style games), each of which may have one or more progressive jackpots or other prizes that may be tracked and updated, e.g., based on the contributions and winnings (i.e., distributions) of the various progressive jackpots across the peer group of electronic gaming devices.

Finally, at Step 708, the method 700 may execute, on the first electronic gaming device, an OBC client, wherein the OBC client is configured to transmit and receive messages to and from at least one gaming platform. As explained in detail above, the messages may comprise one or more of: progressive award contribution amounts; progressive award increment amounts; progressive award distribution messages; or progressive award reset messages, and the OBC client can ensure that each EGM's gaming clients are updated with the proper current values for all active progressive jackpots.

Preferably, all communications for the OBC framework will utilize Transport Layer Security (TLS) protocol, which is the industry standard designed to help protect the privacy of information communicated over the network. Further, these services are preferably run on a separate internal network with its own switch and ports, so that it does not get exposed to the main casino floor network.

IV. Alternatives, Variations, and Conclusion

Numerous embodiments are described in this disclosure and are presented for illustrative purposes only. The described embodiments are not, and are not intended to be, limiting in any sense. The present disclosure is widely applicable to numerous embodiments, as is readily apparent from the disclosure. One of ordinary skill in the art will recognize that the innovations described herein may be practiced with various modifications and alterations, such as structural, logical, software, and electrical modifications. Although particular features of the innovations described herein may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the innovations described herein that must be present in all embodiments.

The Title (set forth at the beginning of the first page of this disclosure) is not to be taken as limiting in any way as the scope of the disclosed embodiments.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" " (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When introducing elements of aspects of the present disclosure or embodiments thereof, the articles "a," "an," "the," and "said" are intended to mean that there are one or more of the elements. The terms "comprising," including," and "having" are intended to be inclusive and mean that there may be additional elements other than the listed elements.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Further, the systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Devices that are in communication with each other need not be in continuous communication with each other, unless expressly specified otherwise. On the contrary, such devices need only transmit to each other as necessary or desirable, and they may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the innovations described herein. Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the innovations described herein, and does not imply that the illustrated process is preferred.

Although a process may be described as including a plurality of steps, that does not indicate that all or even any of the steps are essential or required. Various other embodiments within the scope of the present disclosure include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the present disclosure include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only and are not to be taken as limiting the disclosure in any way.

For the sake of presentation, the detailed description uses terms like "determine" and "select" to describe computer operations in a computer system. These terms denote operations performed by a computer and should not be confused with acts performed by a human being. The actual computer operations corresponding to these terms vary depending on implementation. For example, "determining" something can be performed in a variety of manners, and therefore the term "determining" (and like terms) can indicate calculating, computing, deriving, looking up (e.g., in a table, database or data structure), ascertaining, recognizing, and the like.

As used herein, the term "send" denotes any way of conveying information from one component to another component, and the term "receive" denotes any way of getting information at one component from another component. The two components can be part of the same computer system or different computer systems. The information can be passed by value (e.g., as a parameter of a message or function call) or passed by reference (e.g., in a buffer). Depending on context, the information can be communicated directly between the two components or be conveyed through one or more intermediate components. As used herein, the term "connected" denotes an operable communication link between two components, which can be part of the same computer system or different computer systems. The operable communication link can be a wired or wireless network connection, which can be direct or pass through one or more intermediate components (e.g., of a network). Communication among computers and devices may be encrypted to ensure privacy and prevent fraud in any of a variety of ways well known in the art.

It will be readily apparent that the various methods and algorithms described herein may be implemented by, e.g., appropriately programmed general-purpose computers and computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium for performing the process. The apparatus that performs the process can include components and devices (e.g., a processor, input and output devices) appropriate to perform the process. A computer-readable medium can store program elements appropriate to perform the method.

The term "computer-readable medium" refers to any non-transitory storage or memory that may store computer-executable instructions or other data in a computer system and be read by a processor in the computer system. A computer-readable medium may take many forms, including but not limited to non-volatile storage or memory (such as optical or magnetic disk media, a solid-state drive, a flash drive, PROM, EPROM, and other persistent memory) and volatile memory (such as DRAM). The term "computer-readable media" excludes signals, waves, and wave forms or other intangible or transitory media that may nevertheless be readable by a computer.

The present disclosure provides, to one of ordinary skill in the art, an enabling description of several embodiments and/or innovations. Some of these embodiments and/or innovations may not be claimed in the present application, but they may nevertheless be claimed in one or more continuing applications that claim the benefit of priority of the present application. Applicants may file additional applications to pursue patents for subject matter that has been disclosed and enabled but not claimed in the present application.

The foregoing description discloses only exemplary embodiments of the present disclosure. Modifications of the above disclosed apparatus and methods which fall within the scope of the present disclosure will be readily apparent to those of ordinary skill in the art. For example, although the examples discussed above are illustrated for a gaming market, embodiments of the present disclosure can be implemented for other markets. The gaming system environment of the examples is not intended to suggest any limitation as to the scope of use or functionality of any aspect of the disclosure.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming device, comprising:
one or more processors;
memory; and
control logic, implemented using the one or more processors and memory, configured to perform operations, comprising:
executing an on-board controller (OBC), wherein the OBC is configured to be able to: perform progressive award calculations and store results of the progressive award calculations to the memory;
executing a peer device discovery process, wherein the peer device discovery process is configured to cause:
discovery of a first number, n1, of electronic gaming devices that comprise a peer group;
determination of a second number, n2, of electronic gaming devices within the peer group to be part of a leader quorum; and
election of one electronic gaming device within the leader quorum as a current leader of the peer group, wherein an OBC of the current leader is configured to: perform requested progressive award calculations; store results of the requested progressive award calculations; and transmit the results of the requested progressive award calculations to the other electronic gaming devices in the peer group;
executing at least one gaming platform comprising a progressive award, wherein the progressive award is able to be contributed to by each eligible electronic gaming device in the peer group; and
executing an OBC client, wherein the OBC client is configured to transmit and receive messages to and from the at least one gaming platform,
wherein, in response to the current leader becoming unavailable for a threshold amount of time, a replacement leader from the leader quorum is elected to be the current leader.

2. The electronic gaming device of claim 1, wherein the OBC of the current leader is further configured to be able to: store configuration information related to all active progressive awards within the peer group.

3. The electronic gaming device of claim 1, wherein each electronic gaming device within the peer group is determined to be part of the leader quorum when the first number, n1, is three or fewer.

4. The electronic gaming device of claim 1, wherein the second number, n2, is always determined to be an odd number.

5. The electronic gaming device of claim 1, wherein the election of the current leader is performed using a Raft consensus algorithm.

6. The electronic gaming device of claim 1, wherein the replacement leader is configured to synchronize its state machine log with the other electronic gaming devices of the leader quorum upon being elected the current leader.

7. The electronic gaming device of claim 1, wherein the current leader is further configured to: maintain a state machine log; and transmit the state machine log to the other electronic gaming devices of the leader quorum.

8. The electronic gaming device of claim 1, wherein the current leader is further configured to: receive configuration information from each of the other electronic gaming devices of the peer group.

9. The electronic gaming device of claim 8, wherein the current leader is further configured to: automatically add each electronic gaming device of the peer group to each progressive award that it is eligible for, based on the corresponding received configuration information.

10. The electronic gaming device of claim 1, wherein, in response to the leader quorum dropping below a threshold number of electronic gaming devices, a replacement electronic gaming device is identified and configured to be part of the leader quorum.

11. A method for providing a distributed on-board controller for a group of peer electronic gaming devices, the method comprising:

- executing, on at least a first electronic gaming device, an on-board controller (OBC), wherein the OBC is configured to be able to: perform progressive award calculations and store results of the progressive award calculations to a memory;
- executing, on the first electronic gaming device, a peer device discovery process, wherein the peer device discovery process is configured to cause:
  - discovery of a first number, n1, of electronic gaming devices that comprise a peer group;
  - determination of a second number, n2, of electronic gaming devices within the peer group to be part of a leader quorum; and
  - election of one electronic gaming device within the leader quorum as a current leader of the peer group, wherein an OBC of the current leader is configured to: perform requested progressive award calculations; store results of the requested progressive award calculations; and transmit the results of the requested progressive award calculations to the other electronic gaming devices in the peer group;
- executing, on the first electronic gaming device, at least one gaming platform comprising a progressive award, wherein the progressive award is able to be contributed to by each eligible electronic gaming device in the peer group; and
- executing, on the first electronic gaming device, an OBC client, wherein the OBC client is configured to transmit and receive messages to and from the at least one gaming platform,
- wherein, in response to the current leader becoming unavailable for a threshold amount of time, a replacement leader from the leader quorum is elected to be the current leader.

12. The method of claim 11, wherein the OBC of the current leader is further configured to be able to: store configuration information related to all active progressive awards within the peer group.

13. The method of claim 11, wherein each electronic gaming device within the peer group is determined to be part of the leader quorum when the first number, n1, is three or fewer.

14. The method of claim 11, wherein the second number, n2, is always determined to be an odd number.

15. The method of claim 11, wherein the OBC of the current leader is further configured to be updated with a new IP address for at least one electronic gaming device within the peer group.

16. One or more non-transitory computer-readable media storing computer-executable instructions, which, when executed by one or more processors of a first electronic gaming device, cause the first electronic gaming device to perform the following operations:

- executing an on-board controller (OBC), wherein the OBC is configured to be able to: perform progressive award calculations and store results of the progressive award calculations to a memory;
- executing a peer device discovery process, wherein the peer device discovery process is configured to cause:
  - discovery of a first number, n1, of electronic gaming devices that comprise a peer group;
  - determination of a second number, n2, of electronic gaming devices within the peer group to be part of a leader quorum; and
  - election of one electronic gaming device within the leader quorum as a current leader of the peer group, wherein an OBC of the current leader is configured to: perform requested progressive award calculations; store results of the requested progressive award calculations; and transmit the results of the requested progressive award calculations to the other electronic gaming devices in the peer group;
- executing at least one gaming platform comprising a progressive award, wherein the progressive award is able to be contributed to by each eligible electronic gaming device in the peer group; and
- executing an OBC client, wherein the OBC client is configured to transmit and receive messages to and from the at least one gaming platform,
- wherein, in response to the current leader becoming unavailable for a threshold amount of time, a replacement leader from the leader quorum is elected to be the current leader.

17. The one or more non-transitory computer-readable media of claim 16, wherein the current leader is further configured to: be updated with a new IP address for at least one electronic gaming device within the peer group.

18. The one or more non-transitory computer-readable media of claim 17, wherein the current leader is further configured to: automatically add each electronic gaming device of the peer group to each progressive award that it is eligible for, based on the corresponding received configuration information.

19. The one or more non-transitory computer-readable media of claim 16, wherein, in response to the leader quorum dropping below a threshold number of electronic gaming devices, the current leader is further configured to: identify a replacement electronic gaming device to become a part of the leader quorum.

* * * * *